United States Patent [19]
Field et al.

[11] 3,864,159
[45] Feb. 4, 1975

[54] CAPACITOR HAVING THICK-FILM GLASS-CERAMIC DIELECTRIC LAYER AND METHOD FOR MANUFACTURE

[75] Inventors: Marshall Field, Luckey; James E. Rapp, Oregon, both of Ohio

[73] Assignee: Owens-Illinois Inc., Toledo, Ohio

[22] Filed: Dec. 4, 1972

[21] Appl. No.: 311,854

[52] U.S. Cl.............. 117/212, 252/63.5, 317/258, 106/39.6, 106/47 R
[51] Int. Cl........ H01g 1/00, H01b 3/02, B44d 1/18
[58] Field of Search......... 106/47 R, 39.6; 252/63.5; 317/258; 117/212

[56] References Cited
OTHER PUBLICATIONS
Chemical Abstracts, Vol. 71, Col. 95630h.

*Primary Examiner*—John D. Welsh
*Attorney, Agent, or Firm*—Howard G. Bruss, Jr.; E. J. Holler

[57] ABSTRACT

Disclosed is a capacitor having a thick-film, glass-ceramic, dielectric layer having a dielectric constant above about 90 at 5KHz, dielectric losses less than about 3% at 5KHz, wherein the dielectric layer is formed by heat treating at temperatures below about 1000°C., a thermally crystallizable glass frit consisting essentially of:

| INGREDIENTS | MOLE % |
|---|---|
| $GeO_2$ | 20 – 36 |
| $Nb_2O_5$ | 32 – 40 |
| $Na_2O$ | 32 – 40 | wherein the molar ratio of $Na_2O$ to $Nb_2O_5$ is from about 0.8:1 to about 1.2:1. Optionally specified proportions of $B_2O_3$ can be substituted for $GeO_2$; and CdO and $K_2O$ can be substituted for $Na_2O$.

8 Claims, 2 Drawing Figures

PATENTED FEB 4 1975    3,864,159
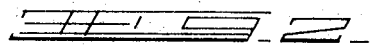
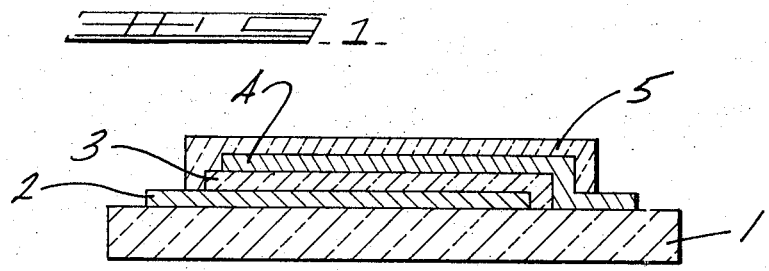
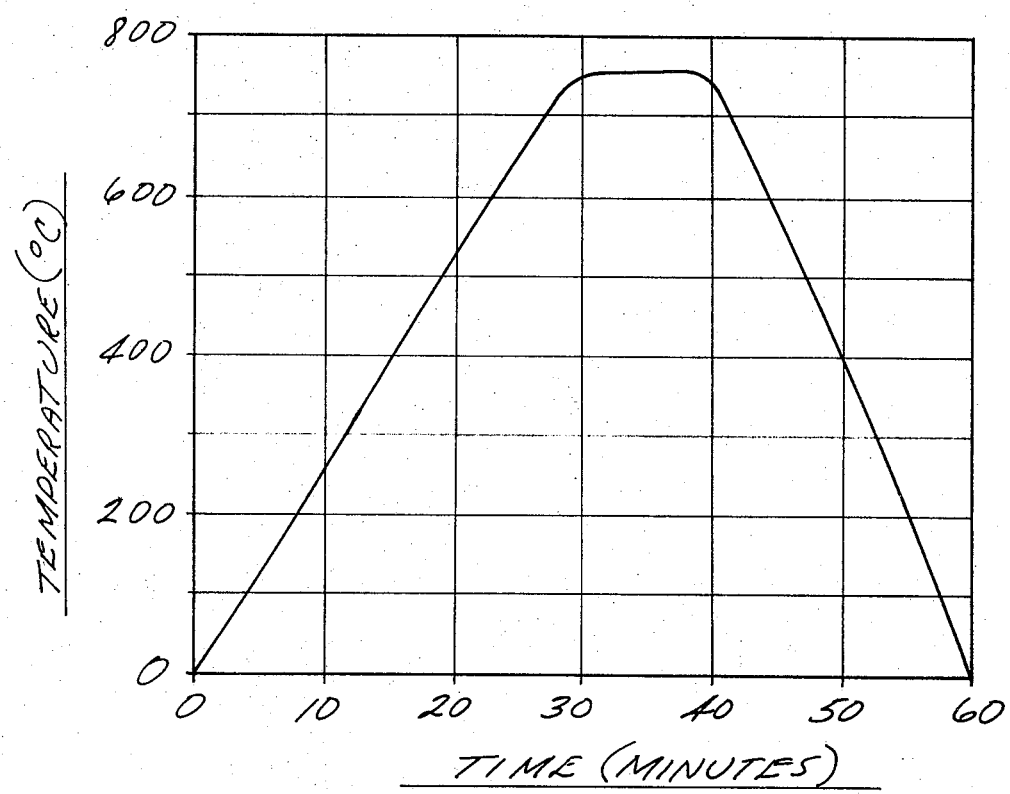

CAPACITOR HAVING THICK-FILM GLASS-CERAMIC DIELECTRIC LAYER AND METHOD FOR MANUFACTURE

This invention relates to capacitors and more particularly to capacitors of the so-called "thick-film" type. Thick-film capacitors are produced by stencil-screening layers of special frits in preselected patterns on electrically active and passive elements including a non-conductive substrate, and then heat treating to produce a permanent, interconnected electrical network.

In commonly assigned copending application Ser. No. 241,448 filed Apr. 5, 1972, the disclosure of which is incorporated by reference, is disclosed a family of thermally crystallizable glasses of the A-B-$GeO_2$ system wherein "A" is $Na_2O$ or a mixture of $Na_2O$ with $K_2O$ and/or $Li_2O$ and "B" is $Nb_2O_5$ or a mixture of $NB_2O_5$ and $Ta_2O_5$ and glass-ceramics made therefrom which have high dielectric constants and low dissipation factors. These glass-ceramics are said to be suitable for chip capacitors and dielectrics in the manufacture of microelectronics printed circuits. Application Ser. No. 241,448 discloses the bulk properties of the glass-ceramics and discloses heat treatments required to produce such bulk properties. Application Ser. No. 241,448 does not specifically disclose thick-film capacitors as evidenced from the examples which refer to the crystallization of bulk samples at temperatures in the neighborhood of 1,050° to 1,600°F. for periods of 2 hours and longer. Heat treatment of thick-film capacitors (i.e., 0.1 mil to 5 mils) at temperatures of less than 1,000°C. are not discussed.

It will be appreciated that some of the thermally crystallizable glass composition disclosed in ser. No. 241,448 can be used in practicing the present invention although many of such compositions (e.g., those containing substantial proportions of $Ta_2O_5$ or $Li_2O$) are not employed for the present purposes.

Thick-film capacitors comprise at least one pair of parallel electrodes separated by a dielectric layer of about 0.1 to 5 mils in thickness. Such capacitors are commerically manufactured by alternately stencil-screening electrodes and dielectric pastes onto non-conductive substrates and firing this composite structure on a continuous belt furnace at temperatures typically ranging from 750° to 1,000°C. for several minutes to form the thick-film capacitor.

In the past, attempts have been made to formulate ceramic dielectrics by mixing a powdered ceramic material having a high dielectric constant and a finely divided glass binder. This technique has not been entirely satisfactory due to problems with flowing, sintering, and adherence to the substrate when firing at less than 1,000°C. Furthermore, it has not been practical to achieve a dielectric layer having a high dielectric constant (i.e., above 90 at 5KHz), low dielectric losses (i.e., dissipation factors at 5KHz less than 3%) and a substantially constant temperature coefficient of capacitance (i.e., ±15% between −25° and +125°C.).

Accordingly, the present invention provides a method of forming such dielectric layers by the controlled crystallization of thermally crystallizable glass compositions to exhibit high dielectric constants and flow well before and during crystallization to form a uniform, continuous, void-free dielectric layer having the above described properties upon firing at a maximum firing temperature of about 750°C. to 1,000°C. for about 5 to about 30 minutes and preferably about 5 to about 15 minutes.

In the drawings, which will be described in connection with the examples that follow, FIG. 1 is a cross-sectional view of a thick-film capacitor embodying the invention and FIG. 2 is a graphical illustration of a typical time-temperature heat treating cycle for crystallizing glass-ceramic dielectrics according the the present invention.

The thermally crystallizable glass frits used in forming such capacitors consist essentially of:

| INGREDIENTS | MOLE % |
|---|---|
| $GeO_2$ | 20 – 36 |
| $Nb_2O_5$ | 32 – 40 |
| $Na_2O$ | 32 – 40 | wherin the molar ratio of $Na_2O$ to $Nb_2O_5$ is from about 0.8:1 to about 1.2:1, wherein up to one-half of the $GeO_2$ is replaced with $B_2O_3$ on a molar basis; wherein up to one-half of the $Na_2O$ is replaced with $K_2O$ on a molar basis; and CdO is present in proportions up to about 5 mole % of the frit composition as molar replacement for $Na_2O$ and $K_2O$; but when $GeO_2$ content is less than 24%, the $B_2O_3$ content is at least about 5%, or the CdO content is at least about 6 1%.

In a preferred embodiment, the crystallizable glass frit consists essentially of:

| INGREDIENT | MOLE % |
|---|---|
| $GeO_2$ | 24 – 36 |
| $Nb_2O_5$ | 32 – 38 |
| $Na_2O$ | 32 – 38 | wherein the molar ratio of $Na_2O$ to $Nb_2O_5$ is from about 0.8:1 to about 1.2:1; wherein up to one-half 3the $GeO_2$ is replaced with $B_2O_2O$ on a molar basis; wherein up to one-half of the $Na_2O$ is replaced with $K_2O$ on a molar basis and CdO is present in proportions up to about 5 mole % of the frit composition as a molar replacement for the $Na_2O$ and $K_2O$.

Frits of the above composition are prepared in the conventional manner by melting the glass forming materials at elevated temperatures (e.g., 1,300°-1600°C.). in a refractory container to form a homogenous molten mass. The mass is then quenched in air or water to produce the frit which is then ground to a powder. The frit is then dewatered and dried.

The frit can be dry mixed with additional glassy binders and then mixed with a liquid or pasty vehicle to produce a fluid mass for easy application by stencil-screening to the non-conductive substrate. C.

The most usual manner of forming the thick-film capacitor is to apply a paste of the frit and vehicle by a screen-stencil technique on a ceramic substrate and then subject the same to a firing operation. As a practical matter, the commercial processing facilities are limited to firing cycles of less than 1,000°c. for several minutes so the thick-film capacitor firing cycle must comply with this limitation.

The electrodes of the capacitors are usually applied by the stencil-screening process in the interest of efficiency and economy so the electrode metallizing pastes will be described together with the capacitor dielectric pastes.

In preparing the capacitor dielectric pastes or the electrode metallizing paste, any inert liquid can be used as the vehicle. Water or any one of various organic liquids, with or without thickening and/or stabilizing agents and/or other common additives, can be used. Examples of organic liquids that can be used are the aliphatic alcohols; esters of such alcohols, for example, the acetates and propionates; the terpenes such as pine oil, alpha- and beta-terpineol and the like; and solutions of resins such as the polymethacrylates of lower alcohols, or solutions of ethyl cellulose, in solvents such as pine oil and the monobutyl ether of ethylene glycol monoacetate.

The vehicle can contain or be composed of volatile liquids to promote fast setting after application; or it can contain waxes, thermoplastic resins or the like materials which are thermofluid so that the vehicle-containing composition can be applied at an elevated temperature to a relatively cold substrate upon which the composition sets immediately.

The proportions of inert vehicle to solids (glass frits and metal powder) in the capacitor dielectric paste and the electrode metallizing pastes can vary considerably depending upon the manner in which the paste is to be applied and the kind of vehicle used. Generally, from 1 to 20 parts by weight of solids (glass frits and metal powder) per part by weight of vehicle will be used to produce a paste of the desired consistency. Preferably, 2 to 10 parts of solids per part of vehicle will be used.

A wide variety of conductive metallizing compositions can be used to form the electrode layers of the present capacitors. While not intending to limit the scope of this invention, the preferred metals are noble metals and particularly gold, silver, platinum, and palladium and alloys and mixtures thereof. These metals are used in the particulate form such as powder or flake. Any of the other conventional conductive metals can also be used.

Any inorganic material which serves to bind the metals to the substrate can be used as the inorganic binder component of the electrode. The inorganic binder can be any of the glass frits employed in metallizing compositions of this general type. U.S. Pat. Nos. 2,822,279 and 3,207,706 described some frit compositions which can be employed either alone or in combination with glass wetting agents such as bismuth oxide. Typical frit compositions usable as binder components in the electrodes include lead borate, lead silicate, lead borosilicate, cadmium borate, lead-cadmium borosilicate, zinc borosilicate and sodium-cadmium borosilicate. The proportions of metals and inorganic binder in the electrodes can be 80–99% and 1–20% respectively.

The screen-printed capacitors of this invention are conveniently prepared by screen-stenciling a first conductive layer (referred to as an electrode) onto a non-conductive substrate and thereafter screen-stenciling dielectric layer of this invention thereover, followed by screen-stenciling a second conductive layer (referred to as a counterelectrode) over the first two layers.

It should be noted that each of the two electrodes and the intermediate dielectric layer of the capacitor formed can be fired separately or at the same time, or the dielectric layer can be fired with either of the two electrodes. Capacitors having more than one electrode and more than one counterelectrode can be screen-stenciled onto the ceramic substrate as desired. The deposited layers can be fired in any number of firings desired, although the technique of cofiring the counterelectrode and the dielectric layer is preferred for economy and efficiency. Furthermore, it has been occasionally observed that the dissipation factors are slightly lower and dielectric constants are slightly higher for cofired capacitors than for similar capacitors which are separately fired. No technical explanation is available for this advantage. Connection of the electrodes and counterelectrodes in separate electrically parallel relationship can be achieved by extending the dimensions of the electrodes in a first direction beyond the dimensions of the dielectric layers and extending the dimensions of the counterelectrodes in a second direction beyond the dimensions of the dielectric layers.

As is conventional in the art, the capacitor structure can be protected from ambient moisture by overglazing with a protective glass, ceramic or organic coating. "Potting" of the capacitor in a thermosetting resin is also a common practice.

Examples of suitable non-conductive substrates are glass, glass-ceramics, porcelain, alumina, zirconia, silica, heat-resistant plastics, with glazed alumina being particularly preferred for commercial applications.

The composition of the glass-ceramic dielectric layer can be represented (Na) $NbO_3$-$nGeO_2$ on a molar basis, wherein (Na) $NbO_3$ is believed to be the ferroelectric perovskite crystalline phase; and the residual glass is $nGeO_2$. $n$ is used because the amount of residual glassy $GeO_2$ matrix is variable depending on composition and heat treatment. When CdO or $K_2O$ is substituted for some of the $Na_2O$, it is suspected that the crystalline phase is $(Na_x + K, Cd_{1-x})NbO_3$. Where a molar excess of $Na_2O$, $K_2O$, or CdO is used over that which can be accommodated in the perovskite crystalline structure, such excess remains in the residual glassy phase.

PROCEDURES

Batch material which yield the compositions set forth in Table I are weighed and mixed in a 500 part total batch as constituent oxides. See Ser. No. 241,448 for typical batches. The batch is placed in a platinum crucible and heated to 1,500°C. in an electric furnace. The melt is manually agitated with a platinum stirrer. After a total melting time of 2 hours, the resulting molten mass is fritted by pouring on water-cooled aluminum rollers. The resulting frit is then cooled in air.

The frit is then placed in a ball-mill equipped with alumina balls. Acetone is also used as a milling medium. The frit is then milled for several hours. The milled frit is then dried for several hours at 150°C. and the resulting powder passes a 400 mesh screen.

Seventy-five parts of milled frit are vigorously blended with 25 parts of organic vehicle to form a viscous dielectric paste. The organic vehicle consisted of mixtures of 25% by weight of methyl methacrylate in diisobutyl adipate. The solids to vehicle weight ratio is determined empirically. The criterion used is "screenability." In essence, this meant paste of the proper viscosity for printing and a vehicle content sufficient for adequate green strength and few or no observable pinholes upon drying.

Conventional electrode paste such as palladium-silver alloy, gold and copper are stencil-screened onto 1 × 1 inch alumina substrates, four squares per substrate, dried and then matured by firing above 750°C. The dielectric paste is then screened thereon and dried. The counter Pd-Ag electrode is then screen-printed over the unfired dielectric, dried to the green state, and then the composite is fired together by specific firing cycles described below. This practice is called cofiring to distinguish it from screening and firing each of the green layers separately. In other examples, the electrodes and dielectric layers are all matured by firing separately.

Firing of the green capacitors is done in a continuous belt furnace according to the time-temperature profile such as that shown in FIG. 2. In FIG. 2, the maximum firing temperature is shown as 750°C. Several of the Examples listed below show maximum firing temperatures other than 750°C. in which cases the time-temperature profiles are generally of the same shape with the stated maximum firing temperature corresponding to the period at the maximum temperature. In FIG. 2, the maximum firing temperature is 750°C. for about 10 minutes.

These time-temperature profiles allow sufficient time on the up slope to allow the organic constituents to volatilize. At the plateau (i.e., the maximum firing temperature), enough flow and crystallization occur to develop the desired properties.

The resulting thick-film capacitor is shown in FIG. 1 where number 1 represents the non-conductive alumina substrate which supports electrode 2 in the form of a predetermined pattern. Thick-film glass-ceramic dielectric layer 3 has a thickness of about 0.1 to about 5 mils and overlays a predetermined portion of electrode 2. Counterelectrode 4 overlays glass-ceramic dielectric layer 3 in such a way that no point on counterelectrode 4 is in electrical contact with electrode 2. Optionally, a non-conductive, protective, moisture-resistant overglaze, indicated by number 5, can be applied.

Subsequent to firing the thick-film capacitors are examined visually for pinholes, cracks, or other structural defects, and the dielectric properties measured on a capacitance bridge versus temperature and frequency. Dielectric constant, K, and dissipation factor are calculated from measurements of capacitance, resistance and dielectric thickness.

The dissipation factor is a measure of electrical loss in a capacitor and is calculated from the formula dissipation factor (expressed as %) = $\tan \delta = \frac{1}{2\pi f C_p R_p}$ where $f$ is the frequency, $C_p$ is the capacitance and $R_p$ is the resistance. Small factors are desirable.

The third parameter is temperature coefficient of capacitance which is a measure of the change of capacitance with temperature. EXAMPLE 1

An electrode paste is formed by blending 75 parts of a conventional palladium-silver electrode alloy powder with 25 parts of an organic vehicle comprising 15% by weight of ethyl cellulose in pine oil. The electrode paste is screen-printed in a predetermined pattern on an alumina substrate and the electrode is matured at 750°C. to form permanent, palladium-silver electrode. several of such electrodes are formed.

A thermally crystallizable glass frit (designated Frit A) having the below composition in mole % is prepared by the procedures described above.

| | |
|---|---|
| $GeO_2$ | 35 % |
| $Nb_2O_5$ | 32.5 |
| $Na_2O$ | 16.25 |
| $K_2O$ | 16.25 |

A dielectric paste is formed by mixing Frit A in the proportion of 75 parts of frit to 25 parts of a blend methyl methacrylate in diisobutyl adipate as an organic binder. The dielectric paste is then screen-printed in a predetermined pattern over several of the palladium-silver electrodes and dried at 100°–150°C. for 15 minutes to dry the binder without expelling same to form a green electrode. Palladium-silver counterelectrodes are then screen-printed in a predetermined pattern over the green dielectric layers.

The resulting capacitor structures are then matured by cofiring by a firing cycle similar to the firing cycle illustrated in FIG. 2 except that the maximum firing temperatures are 800°C., 850°C., 900°C., and 950°C. rather than the 750°C. shown in the drawing.

In each of the above cases the resulting thick-film capacitor has a capacitance of about 30,000 to 40,000 picofarads per square inch, with a substantially void-free, non-porous, semicrystalline, glass-ceramic dielectric layer and a temperature coefficient of capacitance in the range of ±15%, and is suitable for use in microelectronic applications. The capacitor is overglazed with a conventional, moisture-resistant, protective non-conductive, ceramic overglaze and the resulting capacitor structure is as shown in FIG. 1 described above. The properties of the capacitor are set forth below.

| Maximum firing temperature (°C.) | 800 | 850 | 900 | 950 |
|---|---|---|---|---|
| Dielectric constant K at 5KHz and room temperature | 335 | 233 | 262 | 276 |
| Dissipation factor (%) at 5KHz and room temperature | 0.6 | 0.8 | 0.9 | 0.7 |
| Temperature coefficient of capacitance (%) (−25 to +125°C.) | −8% | — | +12% | — |
| Thickness of dielectric layer (mils) | 2–3 | 2–3 | 2–3 | 2–3 |
| Breakdown voltage of dielectric layer (volts per mil thickness) | >250 | >250 | >250 | >250 |

Substantially similar results are obtained when frits having the molar percentage composition listed below are substituted for Frit A in the procedures of this example:

| | | |
|---|---|---|
| GeO$_2$ | 30 % | 25 % |
| Nb$_2$O$_5$ | 35 | 37.45 |
| Na$_2$O | 17.5 | 18.75 |
| K$_2$O | 17.5 | 18.75 |

Substantially similar results are also obtained when the electrodes and counterelectrodes in the procedures of this example are gold, silver or copper.

Substantially similar results are also obtained when green dielectric layer is matured prior to application of the counterelectrode layer. Substantially similar results are also obtained when other organic binders such as a blend of 10 parts of hydrogenated resin, 5 parts of ethyl cellulose in 85 parts of cellosolve are used in formulating the dielectric paste.

EXAMPLE 2

A dielectric paste similar to dielectric paste of Example 1 is prepared except that the frit composition in mole % is:

| | |
|---|---|
| GeO$_2$ | 20% |
| Nb$_2$O$_5$ | 40 |
| Na$_2$O | 20 |
| K$_2$O | 20 |

Capacitors are prepared by the procedures of Example 1 with the maximum firing temperatures set forth below. The capacitors thus formed have a substantially void-free, non-porous, semicrystalline glass-ceramic dielectric layers with temperature coefficients of capacitance in the range of ±15% and the properties set forth below.

| | | |
|---|---|---|
| Maximum firing temperature (°C.) | 850 | 900 |
| Dielectric constant K at 5KHx and room temperature | 372 | 311 |
| Dissipation factor (%) 5KHz and room temperature | 2 | 1.3 |
| Thickness of dielectric layer | 3 | 3 |
| Breakdown voltage of dielectric layer volts per mil | >250 | >250 |

EXAMPLE 3

Examples 3 and 4 illustrate the effectiveness of B$_2$O$_3$ as a replacement for up to one-half of the GeO$_2$. The procedures of Example 1 are repeated except that the frit composition in molar percentage is as follows:

| | |
|---|---|
| GeO$_2$ | 15 % |
| B$_2$O$_3$ | 5 |
| Nb$_2$O$_5$ | 40 |
| Na$_2$O | 20 |
| K$_2$O | 20 |

The resulting capacitors have substantially void-free, non-porous, semicrystalline, glass-ceramic dielectric layers with temperature coefficients of capacitance in the range of ±15% and thickness of 2–3 mils with the properties set forth below:

| | | | | |
|---|---|---|---|---|
| Maximum firing temperature (°C.) | 800 | 850 | 900 | 950 |
| Dielectric constant K at 5KHz and room temperature | 147 | 237 | 175 | 365 |
| Dissipation factor (%) at 5KHz and room temperature | 1% | 1% | 0.6% | 1.1% |

EXAMPLE 4

The procedures of Example 1 are repeated except that the frit composition in molar percentage is as follows:

| | |
|---|---|
| GeO$_2$ | 10 % |
| B$_2$O$_3$ | 10 |
| Nb$_2$O$_5$ | 40 |
| Na$_2$O | 20 |
| K$_2$O | 20 |

The resulting capacitors have a substantially void-free, non-porous, semicrystalline, glass-ceramic dielectric layer with temperature coefficients of capacitance in the range of ±15% and thickness of 2–3 mils with the properties set forth below:

| | | | | |
|---|---|---|---|---|
| Maximum firing temperature (°C.) | 800 | 850 | 900 | 950 |
| Dielectric constant K at 5KHz and room temperature | 149 | 176 | 184 | 258 |
| Dissipation factor (%) at 5KHz and room temperature | 0.8% | 0.8% | 0.8% | 1.0% |

EXAMPLE 5

Examples 5, 6, 7 and 8 illustrate the effectiveness of CdO as a replacement for the Na$_2$O and K$_2$O. The procedures of Example 1 are repeated except that the frit composition in molar percentage is as follows:

| | |
|---|---|
| GeO$_2$ | 25 % |
| Nb$_2$O$_5$ | 37.5 |
| Na$_2$O | 17.75 |
| K$_2$O | 17.75 |
| CdO | 2. |

The resulting capacitors have substantially void-free, non-porous, semicrystalline glass-ceramic dielectric layers with temperature coefficients of capacitance in the range of ±15% and thickness of 2–3 mils with the properties set forth below:

| Maximum firing temperature (°C.) | 700 | 750 | 800 | 850 | 900 |
|---|---|---|---|---|---|
| Dielectric constant K at 5KHz and room temperature | 100 | 225 | 134 | 205 | 180 |
| Dissipation factor (%) at 5KHz and room temperature | 1% | 1.1% | 1.2% | 1.8% | 2% |
| Temperature coefficient of capacitance (%) (−25°C. to +125°C.) | — | −4% | — | +10% | — |

Substantially similar results are obtained when frits having the molar % composition listed below are used for formulating the dielectric pastes and used in the procedures of the example.

| | | |
|---|---|---|
| $GeO_2$ | 25 % | 20 % |
| $Nb_2O_5$ | 37.5 | 40 |
| $Na_2O$ | 18.25 | 19.5 |
| $K_2O$ | 18.25 | 19.5 |
| CdO | 1 | 1 |

EXAMPLE 6

The procedures of Example 1 are repeated except that the frit composition in molar percentage is as follows:

| | |
|---|---|
| $GeO_2$ | 25 % |
| $Nb_2O_5$ | 37.5 |
| $Na_2O$ | 16.25 |
| $K_2O$ | 16.25 |
| CdO | 4 |

The resulting capacitors have substantially void-free, non-porous, semicrystalline, glass-ceramic dielectric layer with temperature coefficients of capaitance in the range of ±15% and thickness of 2–3 mils with the properties set forth below:

| Maximum firing temperature (°C.) | 750 | 850 | 1000 |
|---|---|---|---|
| Dielectric constant K at 5KHz and room temperature | 150 | 250 | 270 |
| Dissipation factor (%) at 5KHz and room temperature | 2% | 3% | 1% |

EXAMPLE 7

The procedures of Example 1 are repeated except that the frit composition in molar percentage is as follows:

| | |
|---|---|
| $GeO_2$ | 20 % |
| $Nb_2O_5$ | 40 |
| $Na_2O$ | 19 |
| $K_2O$ | 19 |
| CdO | 2 |

The resulting capacitors have substantially void-free, non-porous, semicrystalline, glass-ceramic dielectric layers with temperature coefficients of capacitance in the range of ±15% and thickness of 2–3 mils with the properties set forth below:

| Maximum firing temperature (°C.) | 800 | 850 | 900 |
|---|---|---|---|
| Dielectric constant K at 5KHz and room temperature | 422 | 337 | 315 |
| Dissipation factor (%) at 5KHz and room temperature | 1.7 | 1.4 | 1.3 |

EXAMPLE 8

The procedures of Example 1 are repeated except that the frit composition in molar percentage is as follows:

| | |
|---|---|
| $GeO_2$ | 20 % |
| $Nb_2O_5$ | 40 |
| $Na_2O$ | 18 |
| $K_2O$ | 18 |
| CdO | 4 |

The resulting capacitors have substantially void-free, non-porous, semicrystalline, glass-ceramic dielectric layers with temperature coefficients of capacitance in the range of ±15% and thickness of 2–3 mils with the properties set forth below:

| Maximum firing temperature (°C.) | 750 | 850 | 1000 |
|---|---|---|---|
| Dielectric constant K at 5KHz and room temperature | 400 | 160 | 270 |
| Dissipation factor (%) at 5KHz and room temperature | 2% | 1% | 3% |

Having thus described the invention, what is claimed is:

1. In the method for forming a capacitor having a thick-film, glass-ceramic, dielectric layer positioned between an electrode and a counterelectrode, wherein a mixture of a thermally crystallizable glass frit and a binder is deposited in a predetermined pattern on said electrode, and the mixture is maintained at a temperature and for a time sufficient to expel said binder, fuse and crystallize said crystallizable glass frit to form said dielectric layer, the improvement for forming a capacitor having a dielectric constant of at least about 90 at 5KHz, a dissipation factor of less than about 3% at 5KHz and a temperature coefficient of capacitance of ±15% over the range of −25°C. to 125°C. wherein said thermally crystallizable glass frit consists essentially of:

| INGREDIENTS | Mole % |
| --- | --- |
| $GeO_2$ | 20 – 36 |
| $Nb_2O_5$ | 32 – 40 |
| $Na_2O$ | 32 – 40 | wherein the molar ratio of $Na_2O$ to $Nb_2O_5$ is from about 0.8:1 to about 1.2:1, wherein up to one-half of the $GeO_2$ is replaced with $B_2O_3$ on a molar basis; wherein up to one-half of the $Na_2O$ is replaced with $K_2O$ on a molar basis; and CdO is present in proportions up to about 5 mole % of the frit composition as molar replacement for $Na_2O$ and $K_2O$; but when $GeO_2$ content is less than 24%, the $B_2O_3$ content is at least about 5%, or the CdO content is at least about 1%.

2. The method of claim 1 wherein said thermally crystallizable glass frit consists essentially of:

| INGREDIENT | MOLE % |
| --- | --- |
| $GeO_2$ | 24 – 36 % |
| $Nb_2O_5$ | 32 – 38 |
| $Na_2O$ | 32 – 38 | wherein the molar ratio of $Na_2O$ to $Nb_2O_5$ is from about 0.8:1 to about 1.2:1; wherein up to one-half of the $GeO_2$ is replaced with $B_2O_3$ on a molar basis; wherein up to one-half of the $Na_2O$ is replaced with $K_2O$ on a molar basis and CdO is present in proportions up to about 5 mole % of the frit composition as a molar replacement for the $Na_2O$ and $K_2O$.

3. The method of claim 1 wherein said counterelectrode is applied on the fused and crystallized dielectric layer.

4. The method of claim 1 wherein the fusion and crystallization is carried out at a maximum temperature of about 750°C. to about 1,000°C. for a time period of about 5 to about 30 minutes.

5. The method of claim 4 wherein said time period is about 5 to about 15 minutes.

6. The method of claim 4 wherein a blend of particulate counterelectrode material in a binder is screen-stenciled onto the deposited mixture of said thermally crystallizable glass frit and binder, and the counterelectrode is formed during the fusion and crystallization of said dielectric layer.

7. In a capacitor comprising at least one pair of electrodes which are separated by a glass-ceramic dielectric layer, the improvement wherein said glass-ceramic dielectric layer has dielectric constant in excess of about 90 at 5KHz and a dissipation factor of less than about 3% at 5KHz and a temperature coefficient of capacitance of ±15% over the range of −25°C. to +125°C., said glass-ceramic having been formed by the in situ thermal crystallization of a thermally crystallizable glass consisting essentially of:

| INGREDIENT | MOLE % |
| --- | --- |
| $GeO_2$ | 20 – 36 |
| $Nb_2O_5$ | 32 – 40 |
| $Na_2O$ | 32 – 40 | wherein the molar ratio of $Na_2O$ to $Nb_2O_5$ is from about 0.8 to about 1.2:1; wherein up to one-half of the $GeO_2$ is replaced with $B_2O_3$ on a molar basis; wherein up to one-half of the $Na_2O$ is replaced with $K_2O$ on a molar basis and CdO is present in proportions up to about 5 mole % of the frit composition as a molar replacement for $Na_2O$ and $K_2O$; but when the $GeO_2$ is less than 24% the $B_2O_3$ content is at least about 5%, or the CdO content is at least about 1%.

8. The capacitor of claim 7 wherein said thermally crystallizable glass frit consists essentially of:

| INGREDIENT | MOLE % |
| --- | --- |
| $GeO_2$ | 24 – 36 % |
| $Nb_2O_5$ | 32 – 38 |
| $Na_2O$ | 32 – 38 | wherein the molar ratio of $Na_2O$ to $Nb_2O_5$ is from about 0.8:1 to about 1.2:1; wherein up to one-half of the $GeO_2$ is replaced with $B_2O_3$ on a molar basis; wherein up to one-half of the $Na_2O$ is replaced with $K_2O$ on a molar basis and CdO is present in proportions up to about 5 mole % of the frit composition as a molar replacement for $Na_2O$ and $K_2O$.

* * * * *

UNITED STATES PATENT OFFICE
CERTIFICATE OF CORRECTION

Patent No. 3,864,159            Dated Feb. 4, 1975

Inventor(s) Marshall Field et al

It is certified that error appears in the above-identified patent and that said Letters Patent are hereby corrected as shown below:

On the last line of the Abstract, "Na$_2$O" should be --- Na$_2$O ---.
Column 1, line 34 "ser." should be --- Ser. ---.
Column 2, line 27 after "about" delete --- 6 ---.
Column 2, line 39 after "one-half" delete --- 3 --- and insert --- of ---.
Column 2, line 40 "B$_2$O$_2$O" should be --- B$_2$O$_3$ ---.
Column 2, line 55 after "substrate" delete --- C. ---.
Column 2, line 61 "1,000°c." should be --- 1,000°C. ---.
Column 4, line 32 "$_{1-x}$]" should be --- $_{1-x}$) ---.
Column 4, line 42 "1,500°C." should be --- 1,550°C. ---.
Column 9, line 41 "capaitance" should be --- capacitance ---.
Column 10, line 47 "SKHz" should be --- 5KHz ---.

Signed and sealed this 29th day of April 1975.

(SEAL)
Attest:

RUTH C. MASON
Attesting Officer

C. MARSHALL DANN
Commissioner of Patents
and Trademarks